No. 671,141. Patented Apr. 2, 1901.
G. MILLEN.
CUSHION TIRE FOR VEHICLES.
(Application filed June 26, 1900.)
(No Model.)
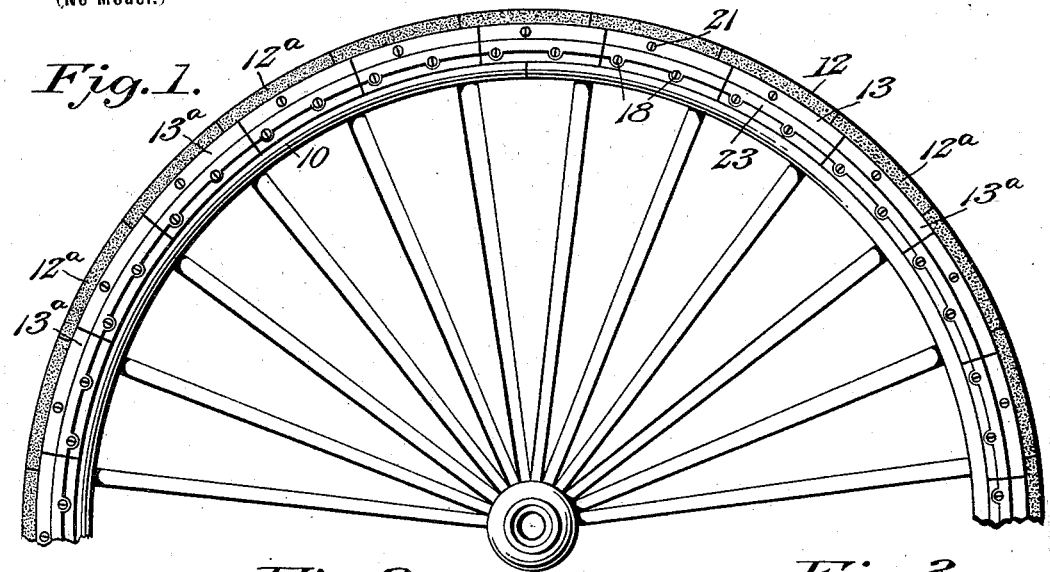
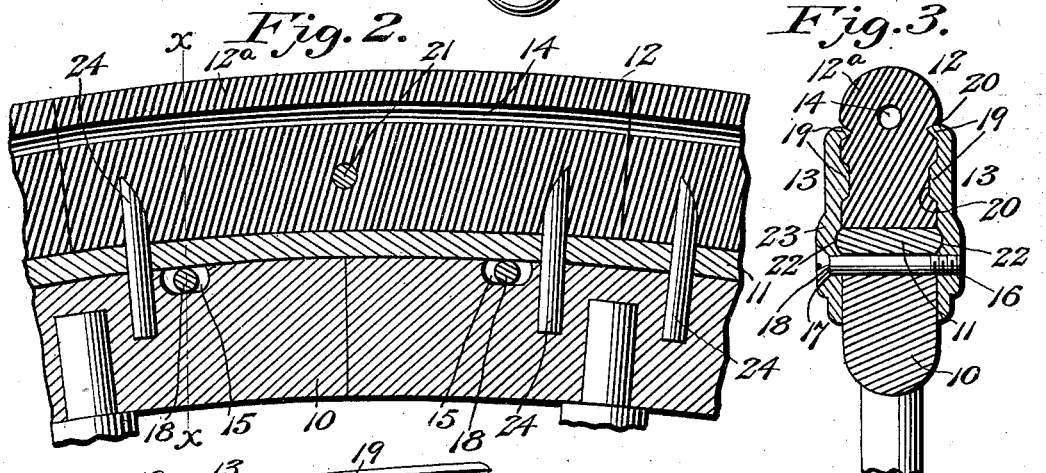
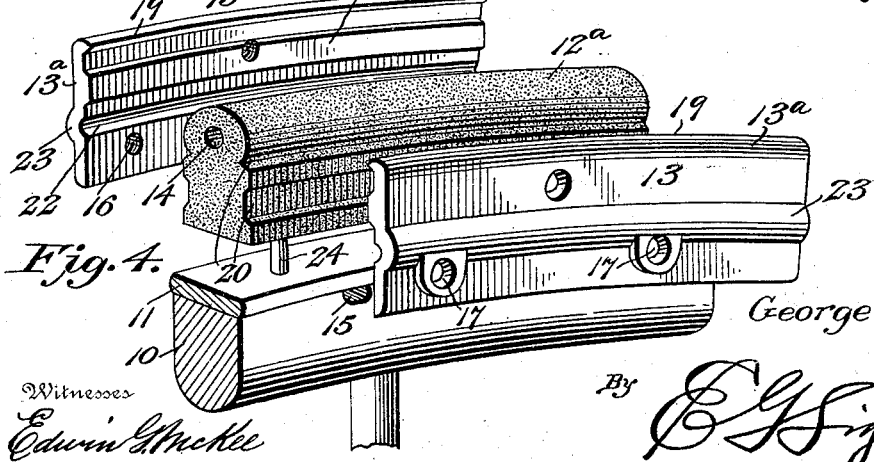
George Millen
Inventor
Witnesses

UNITED STATES PATENT OFFICE.

GEORGE MILLEN, OF SAN ANTONIO, TEXAS.

CUSHION-TIRE FOR VEHICLES.

SPECIFICATION forming part of Letters Patent No. 671,141, dated April 2, 1901.

Application filed June 26, 1900. Serial No. 21,655. (No model.)

*To all whom it may concern:*

Be it known that I, GEORGE MILLEN, a citizen of the United States, residing at San Antonio, in the county of Bexar and State of Texas, have invented a new and useful Cushion-Tire for Vehicles, of which the following is a specification.

This invention relates to vehicle-wheels, and has special reference to an improved cushion-tire attachment for ordinary wheels.

The particular object thereof is to provide an elastic tire and fastening means for the same, so that it can be applied to a wheel without altering the construction thereof and be securely held against accidental displacement.

A further object is to provide a tire made of separable sections, whereby if one section becomes destroyed or injured it may be removed and replaced without the necessity of an entire new tire.

In order that the invention may be fully understood, the preferred form is described in the following specification and shown in the drawings which accompany and form a part of the same, and in which—

Figure 1 is a side elevation of a portion of an ordinary vehicle-wheel, showing the invention applied thereto. Fig. 2 is a longitudinal section of a portion of the wheel on an enlarged scale. Fig. 3 is a cross-section on line X X of Fig. 2. Fig. 4 is a detail perspective of a portion of the wheel, showing the tire-section and clamp-sections detached.
Similar numerals of reference designate corresponding parts in all the figures of the drawings.

In the drawings, 10 designates the felly, and 11 the metallic tire, of an ordinary vehicle-wheel. Upon the metallic tire is arranged the improved cushion-tire 12, which is held in place by the clamp-plates 13. The tire 12, as shown, is made up of separate sections 12ª, which are provided with flat inner surfaces that rest upon the metallic tire 11. These sections may be made solid or provided with longitudinal openings, as 14, which will make the tire more elastic or resilient. In order to fasten these sections in place, the clamp-plates 13 are provided, which are also preferably constructed in sections 13ª, a pair of said sections being used for each tire-section and arranged to be fastened on opposite sides of the felly, and projecting over the metallic tire engage the opposite sides of the elastic-tire section. In order to fasten these sections to the felly, transverse slots 15 are provided in the latter directly under the metallic tire, and one series of clamp-sections, preferably those on the inner side of the wheel, are provided with screw-threaded openings 16, that aline with the slots 15 of the felly. The opposite series of clamp-sections are provided with countersunk openings 17, also arranged to aline with the slots 15, and flat-headed screws 18 are arranged to be passed through the alined openings 16 of the inner series of clamp-plates. By this construction the shanks of the screws bear directly against the metallic tire, thus obviating the same working or tearing loose, besides placing the binding strain directly upon the metallic tire. These clamp-sections are preferably arranged so that they will bridge the ends of the felly-sections, and thereby greatly strengthen the joints of the same. The portions of the clamp-plates which project above the wheel are provided upon their inner faces with spaced longitudinal ribs 19, one being arranged at the outer edge, and these ribs engage corresponding grooves 20, arranged in the faces of the tire-sections. Transversely-arranged screws 21 are also passed through the clamp-plates and the cushion-tire, whereby the latter is pinched tightly between the former.

In the ordinary vehicle-wheel the metallic tire is generally wider than the felly, so that the clamp-plates are each provided with a longitudinal groove 22 for the reception of the edge of the tire. The outer faces of the clamp-plates are also each provided with a longitudinal rib 23, which is arranged to receive the wear from the rub-iron, and thereby protect the rubber tire.

The clamp-sections, as shown, are preferably arranged to extend beyond the tire-sections at one end and engage the next section, whereby the joints of the several sections are bridged and are more firmly held in position.

In order to more securely hold the rubber sections against longitudinal movement or "creeping," the spurs 24 are provided, which project above the face of the metallic tire and have their ends sharpened, whereby they may be forced into the inner face of the tire-sections. These spurs are secured by being passed through the metallic tire and firmly seated in the felly.

From the above description it will be seen that an inexpensive tire is provided which can be readily attached to an ordinary vehicle-wheel and easily repaired by an inexperienced person. Furthermore, the fastening means serves as a strengthening means for the wheel-felly. A still further advantage resides in constructing the tire in sections, whereby if one section should become injured it can be removed and replaced without the necessity of an entire new tire.

While the several elements of the attachment have been shown and described as being made up of a plurality of sections, it will be understood that the essential features of the invention may be embodied with the tire and clamps made of a single piece or of any number of sections, as desired.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having now described the invention, what I claim as new, and desire to secure by Letters Patent, is—

1. The combination with the metallic tire and felly of an ordinary wheel, of an elastic tire arranged upon the metallic tire, spurs set in recesses in the felly and passing through the metallic tire, said spurs having beveled ends piercing the elastic tire and extended partly through the same, and clamps arranged to engage the opposite sides of the elastic tire and felly.

2. The combination with the metallic tire and felly of an ordinary wheel, of an elastic tire composed of separate sections arranged upon the metallic tire, a pair of oppositely-arranged independent clamp-plates for each of said elastic-tire sections, said clamp-plates engaging the opposite sides of the felly and elastic-tire sections respectively, and binding devices connecting the opposite plates both through the elastic tire and the wheel-felly.

3. The combination with the metallic tire and felly of an ordinary wheel, of an elastic tire composed of separate sections arranged upon the metallic tire, a pair of separate clamp-sections for each of said elastic-tire sections, said clamp-sections engaging the opposite sides of the felly and elastic-tire sections respectively and bridging the joints between said elastic-tire sections.

In testimony that I claim the foregoing as my own I have hereto affixed my signature in the presence of two witnesses.

GEORGE MILLEN.

Witnesses:
HARRY E. STAFFORD,
R. L. BALL.